(No Model.)  2 Sheets—Sheet 1.
M. O. STODDARD.
MILK SETTING APPARATUS.

No. 315,448. Patented Apr. 7, 1885.

Witnesses:
John Buckle,
L. H. Osgood.

Martin O. Stoddard,
Inventor
By Worth Osgood
Attorney (No Model.)
M. O. STODDARD.
MILK SETTING APPARATUS.
No. 315,448. Patented Apr. 7, 1885.
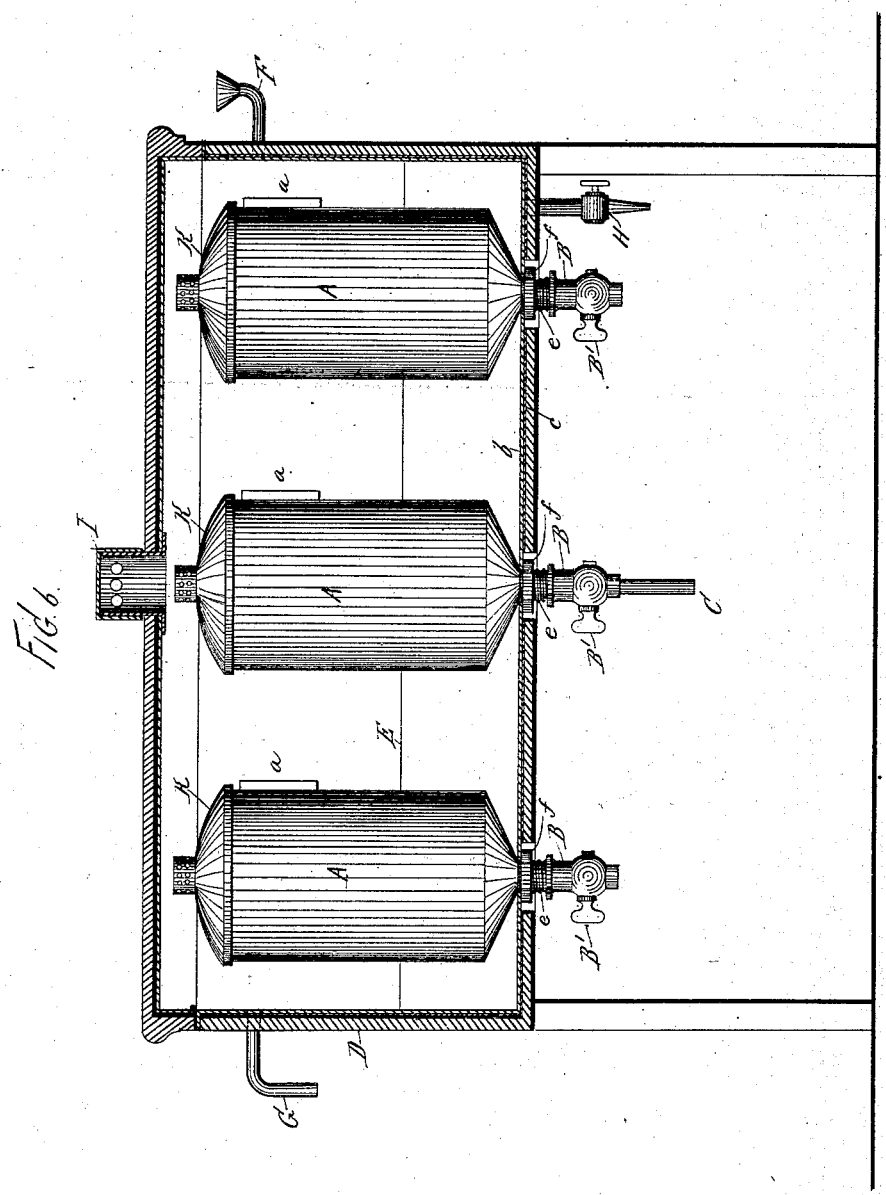

UNITED STATES PATENT OFFICE.

MARVIN O. STODDARD, OF POULTNEY, VERMONT.

MILK-SETTING APPARATUS.

SPECIFICATION forming part of Letters Patent No. 315,448, dated April 7, 1885.

Application filed June 16, 1884. (No model.)

*To all whom it may concern:*

Be it known that I, MARVIN O. STODDARD, of Poultney, county of Rutland, and State of Vermont, have invented certain new and useful Improvements in Milk-Setting Apparatus, of which the following is a full, clear, and exact description, reference being had to the accompanying drawings, and to the letters of reference marked thereon.

My invention relates to that class of devices intended for holding milk for the purpose of obtaining cream therefrom, for keeping the milk cool, and for other purposes, which devices are ordinarily known as "milk-setting apparatus" or "creameries."

Among the objects of my invention are the simplification and improvement of the means employed for withdrawing part or all of the cream from off the milk or discharging part or all of the contents of the milk-holding can, dispensing with the stuffing-box heretofore employed, arranging the outlet or withdrawing tube, so that it may be readily removed from the can and readjusted to place when required, and economizing in space required beneath the apparatus for the accommodation of the vessels for receiving the contents of the cans as discharged. To accomplish these objects, and to secure other advantages, my improvements involve certain novel and useful relative arrangements or combinations of parts, peculiarities of construction, and principles of operation, all of which will be herein first fully described, and then pointed out in the claims.

Figure 1:
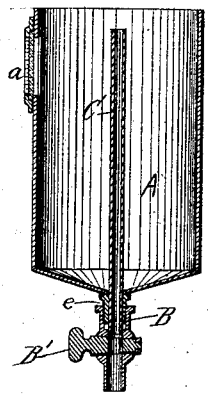
Figure 2:
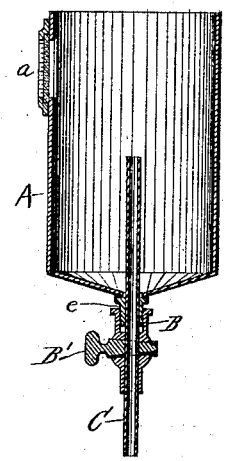
Figure 3:
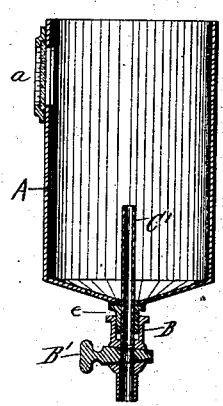
Figure 4:
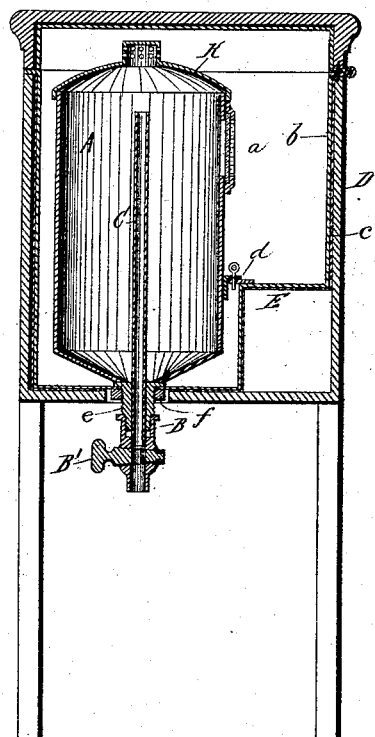
Figure 5:
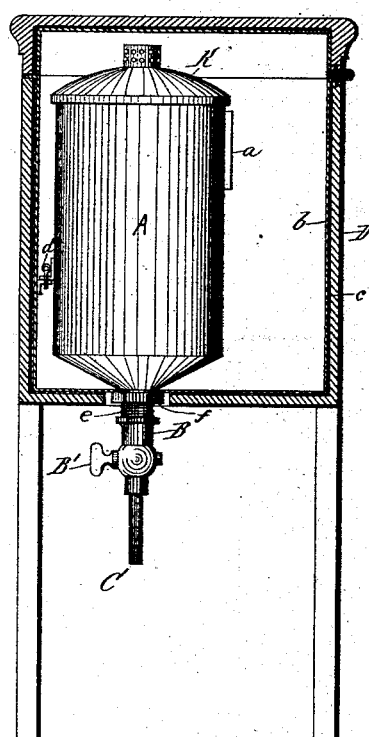

In the accompanying drawings, forming part of this specification, Figure 1 is a central vertical section of a milk-setting can having a cock or faucet applied thereon, and the withdrawing-tube supported in the inlet to said faucet, and arranged for the withdrawal of cream from near the top of the can. Fig. 2 is a similar view showing the tube projecting down through the faucet and held in place by the plug thereof. Fig. 3 is also a similar view, but showing a shorter tube, which may be employed same as the longer tube when the can is only partly filled. Fig. 4 is a sectional view of a case or cabinet and a can having my improvements located therein, the lower part of the can being situated in a narrow well or channel which may be formed in the cabinet; and Fig. 5 is a sectional view of a cabinet without the narrow well, showing a can (in elevation) having my improvements, and supported by a lock or catch applied upon the front of the tank instead of upon the ledge, as in Fig. 4. Fig. 6 is a sectional elevation showing three cans in a cabinet, and indicating how any number may be employed.

In all these figures like letters of reference, wherever they occur, indicate corresponding parts.

A represents a milk-setting can, which may be of any of the usual forms or sizes and may be employed in a cabinet, or otherwise supported, and be partly or wholly charged with milk. Upon the bottom of this can I apply a cock or faucet, B, having the usual turning-plug, B', which operates as a valve for governing or arresting the flow of liquid. This faucet may be applied in a permanent or semi-permanent manner, and occupies but little space beneath the can.

C is a cylindrical tube neatly fitting into the upper neck of the faucet, from which it may be readily detached. The orifice in the valve or plug is made large enough to admit of the passage of the tube C through it. Glass or other transparent panes or plates, as *a*, may be located in the wall of the can, which panes are preferably graduated into inches and fractional parts thereof for convenience of dairymen who dispose of their cream, the value of the cream being determined by the measurement thereof in depth or thickness. When the can is charged, the faucet is closed, and when it is desired to draw off the cream the tube C is adjusted in the upper neck of the faucet, and the plug thereof turned so as to permit the descent of the tube. When the top of the tube is depressed sufficiently, the plug is turned so that the wall of the orifice therein will crowd against the tube, thus sustaining the latter at the desired point. The adjustment of the tube may be regulated by the hand (applied below the faucet) and its position ascertained by inspection through the glass pane at *a*, through which the bottom of the cream may be seen and the tube moved down a distance from the surface equal to the depth of the cream. I do not, however, regard the glass pane as a necessity, for the adjustment can be easily determined after once or twice using the apparatus. If the first adjustment does not remove all the cream, the tube can be gradually lowered with the hand and adjusted, inspection being had through the open top of the can until the cream is all removed. If the can be only partially filled, then a short discharging or withdrawing tube, as at C', Fig. 3, may be employed. To withdraw part of the milk the tube has only to be depressed as far as required. To completely empty the can the tube may be wholly withdrawn and the faucet opened.

In my patent of May 3, 1881, No. 240,861, I have shown a sliding tube for discharging the contents of the milk-setting can, such tube being provided with a faucet at its lower end and running through a stuffing-box applied upon the can.

In the present construction I am enabled to dispense with the stuffing-box entirely, thus economizing in cost of manufacture as well as simplifying the construction, and by omitting the faucet from the end of the tube I am enabled to set the cans lower down, inasmuch as less room is required beneath the discharge end of the tube for the accommodation of the receptacles for the milk, &c., drawn from the can. In the construction of creameries this is an important consideration, for it makes the apparatus more convenient and accessible for filling, cleaning, &c.

D represents a tank or box for containing one or a number of the cans, in which box they may be kept cool by the application of ice or water. The box is preferably lined with metal, as indicated at $b$, and protection against external heat insured by a paper or other lining, as at $c$, between the metal and the wooden exterior. In Fig. 4 a ledge, E, contracts the lower part of the tank, making a narrow well or channel, into which the cans may be placed. When they are placed in such a well, a lock or catch, $d$, applied upon the ledge, serves to support them in an upright position.

When applied in a box or tank without the ledge, as in Fig. 5, the catch may be affixed to one of the walls of the tank, substantially as shown.

The neck or inlet to the faucet represented at $e$ is threaded exteriorly, and being affixed to the bottom of the can, is passed down through a perforation in the sheet-metal bottom of the tank. A nut, $f$, with or without a suitable packing-gasket, applied upon the neck $e$ is turned up hard enough to prevent leakage of water from the tank, and the faucet is then applied on the neck below the nut. This construction is simple and efficient and admits of the ready removal of the can from the tank or adjustment therein, as well as that it affords a steady support for the bottom of the can. The wood of the tank is cut away so as to permit the nut $f$ or the packing-gasket to bear against the interior lining. The outlet for the milk and cream is thus made to pass down through the bottom of the tank without danger of leakage. F is an inlet for water, and G an outlet communicating with the interior of the tank. These permit the application of running water to keep the cans cool.

H is a plug at bottom, through which the tank may be drained. I is a ventilator on the top or cover of the tank, and K K are the ventilating-covers of the cans. Any number of the cans may be employed, and they may be supported in the tank or in any other convenient position. The particular construction of the tank is in no way material. It may be supported on legs, as shown, or otherwise sustained above the floor, and the lower part may be boxed in, if desired, forming a closed cabinet. One of the removable tubes will answer for withdrawing the contents of any number of cans, and the tube is easily kept clean. By removing this tube the can can be more readily and thoroughly cleaned than by use of the form of tube and attached faucet shown in my former patent above named, which is intended always to remain in working position.

I have shown the milk-cans as having bottom plates inclined toward the center or axis, but the inclination might be made toward a point nearer the margin, or omitted altogether, if preferred.

The improvements above described have been found in practice to admirably answer the purposes or objects of the invention previously set forth.

Having now fully described my invention, what I claim as new, and desire to secure by Letters Patent, is—

1. The combination, with a milk-setting can provided with a cock or faucet at bottom, of a sliding tube adjustable through the valve or plug of said faucet, substantially as and for the purposes set forth.

2. The combination, with a milk-setting can provided with a cock or faucet at bottom, of a sliding tube fitting the neck or inlet to said faucet, arranged to pass through the orifice in the plug or valve of the faucet and to be clamped or held in position by the plug, substantially as and for the purposes set forth.

3. In combination with a milk-can surrounded by a water jacket or tank, a cock or faucet the neck of which communicates with the interior of the can, and the sliding tube made adjustable through the orifice of the valve in the faucet, substantially as shown and described.

4. The herein-described milk-setting apparatus composed of a milk-holding can, a surrounding water jacket or tank, a cock or faucet the neck of which communicates with the interior of the can, and the sliding removable tube arranged to pass through the orifice in the valve or plug, substantially as shown and described.

In testimony that I claim the foregoing I have hereunto set my hand in the presence of two witnesses.

MARVIN O. STODDARD.

Witnesses:
 CYRUS GATES,
 FREDERICK S. PLATT.